United States Patent Office 3,524,911
Patented Aug. 18, 1970

---

3,524,911
AEROSOL INSECTICIDAL COMPOSITIONS
Seymour Leavitt, Lincolnwood, Ill., assignor to Madison Chemical Corporation, Maywood, Ill., a corporation of Delaware
No Drawing. Continuation-in-part of application Ser. No. 504,090, Oct. 23, 1965. This application Apr. 15, 1968, Ser. No. 721,181
Int. Cl. A01n 9/00, 9/36
U.S. Cl. 424—45                    12 Claims

ABSTRACT OF THE DISCLOSURE

An insecticidal composition in an aerosol spray container comprising a substantially nonaqueous mixture of a toxic concentration of a vaporizable insecticide which is volatile at ambient temperatures, and a substantially inert, foam-forming carrier exemplified by an unsaponified fatty acid which is normally solid at room temperatures. The inert, foam-forming carrier is characterized in that, upon spraying of the pressurized mixture from an aerosol spray container onto a surface, it is formed into a stable, substantially form-sustaining foam which maintains the insecticide carried thereby on the surface and retards the volatilization of the insecticide to an extent whereby the insecticide is released from said foam in toxic concentrations at a controlled rate over a prolonged period at ambient temperatures. The insecticide is preferably present in the carrier in its applied form in a concentration of from about 5% to about 50%, by weight.

---

This application is a continuation-in-part application of application Ser. No. 504,090, filed Oct. 23, 1965, now abandoned.

It is well known that numerous highly effective insecticides, while providing rapid toxic action in the vapor phase, dissipate quickly and have little or no residual toxic value. Heretofore, efforts to prolong the toxic activities of such insecticides have involved molding or casting a resin, having a quantity of the insecticide incorporated therein, into a solid strip product from which the insecticide is slowly released. The solid strip is cut into suitable lengths by the user and tacked, nailed, stapled, or otherwise fastened, to a surface, or is suspended by means of a string, in a desired location. This approach to the problem of prolonging the toxic activity of high vapor pressure insecticides, while reasonably effective, has a number of disadvantages. Thus, for instance, the solid strip must be physically handled by the user before it can be fastened or hung in position. As a result, contamination of the hands of the user with the toxic agent incorporated in the strip is inevitable and precautions, such as thorough washing with soap and water, must be taken to avoid any harmful toxicological effects to the user. Furthermore, fastening or hanging of the solid strips is cumbersome, as is the removal and discarding of spent strips.

In accordance with the present invention, insecticidal compositions are provided which not only eliminate all of the disadvantages of the solid strip-type insecticidal product but enable more effective and efficient utilization of the toxic action of the insecticide to be attained. Apart from these benefits, the insecticidal compositions of this invention lend themselves to economies in manufacture and packaging not realized with the solid strip product. No special equipment such as molds, or the like, is required with the compositions of this invention. The compositions are formulated in batch form and then simply packaged in suitable containers in accordance with known techniques.

The objectives of the present invention are most advantageously achieved with aerosol spray compositions comprising an essentially nonaqueous mixture of a toxic concentration of a vaporizable insecticide, especially desirably an insecticide which has a relatively low vapor pressure at room or ambient temperatures, and a foam-forming agent or substance. The foam-forming substance is characterized in that it is substantially inert with respect to the insecticide and is capable, when sprayed from an aerosol spray container onto a surface, in intimate admixture with the insecticide, of forming a self-sustaining, relatively rigid insecticide-containing foam on the surface which foam persists for prolonged periods of time and which releases the insecticide to the surrounding atmosphere at a controlled rate in insecticidally effective concentrations over a prolonged period of time at room or ambient temperatures. The thus formulated compositions are placed in suitable aerosol spray containers utilizing, for example, conventional cold loading or pressure loading techniques, and are ready for use. In this form, the composition, as it is dispensed from the container under pressure, not only immediately enables a toxic quantity of the contained insecticide to be volatilized and dispersed in a room for quick action, but provides for the aforementioned controlled release of the insecticide from the foam developed on a surface to which the composition is applied. The insecticide-containing foams formed from the compositions of this invention easily can be applied to surfaces not normally visible to view such as the bottoms of chair seats, the undersurfaces of tables, and the like, and thus enable extremely effective distribution of the toxic vapors of the insecticide in substantially any sized room.

Insecticides having utility for the purposes of this invention can be selected from a wide group typical examples of which are 2,2-dichlorovinyldimethylphosphate (DDVP);
0,0-dimethyl 0-1-carbmethoxy-1-propen-2-yl phosphate (OS-2046);
0,0-diethyl 0-p-nitrophenyl phosphorothionate (Parathion);
tetraethyl pyrophosphate (TEPP);
diisopropyl phosphorofluoridate (DFP);
isopropyl methylphosphono-fluoridate (Sarin);
3,3-dimethyl-2-butyl methylphosphonofluoridate (Soman);
0,0-dimethyl 2,2,2-trichloro-1-hydroxyethylphosphonate (Dipterex);
0,0-diethyl 0-(2-isopropyl-4-methyl-pyrimidyl [6]) thionophosphate (Diazinon);
1,2,3,4,10,10-hexachloro-1,4,4a,5,8,8a-hexahydro-1,4,5,8-dimethanonaphthalene (Aldrin);
1,2,3,4,10,10-hexachloro-6,7-epoxy,1,4,4a,5,6,7,8,8a-octahydroxy-1,4-endo-exo-5,8-dimethanonaphthalene (Dieldrin);
benzene hexachloride (Lindane);
0,0-dimethyl S-1,2-dicarboethoxyethyl phosphorodithioate (Malathion);
ethyl N,N-dimethylphosphoro amidocyanidate (Tabun);
synergized pyrethrins,
and the like, and compatible mixtures of any two or more thereof. Of especial importance are the relatively volatile organophosphorus insecticides, disclosed, for instance, in U.S. Pats. Nos. 2,956,073 and 3,116,201, particularly the dialkyl substituted vinyl phosphates exemplified by DDVP.

While any materials, compatible with or inert to the particular insecticide utilized, can be utilized which will form stable rigid or substantially rigid or form-sustaining foams when released from an aerosol, or like, spray container, various of which are well known in the art, it is especially desirable to utilize higher fatty or monocarboxylic acids and polymeric fatty acids which are solid at room temperatures such as myristic acid, palmitic acid, stearic acid, arachidic acid, melissic acid, and the like. Generally speaking, it is preferred to use those of such acids as have good solubility in chlorinated organic solvents and which have in the range of 18 to 22 carbon atoms, stearic acid, or commercial sources of stearic acid such as triple pressed stearic acid, being especially satisfactory. The acids most advantageously are utilized in an essentially unsaponified form. When thusly employed, the acids provide excellent foams of the character indicated and, in addition, function as bait for insects. If desired, various materials which impart residual insecticidal "bait" properties can be incorporated into the compositions of the present invention as, for instance, peanut oil or cottonseed oil, to augment the "bait" properties of the acids.

As indicated hereinabove, the insecticidal compositions of the present invention are utilized in the form of pressurized spray solutions or aerosols. Such solutions or aerosols comprise an organic solvent and a suitable propellant. A wide range of organic solvents can be used in forming pressurized spray solutions or aerosols in accordance with the practice of this invention. Among these are chlorinated solvents including methylene chloride, ethylene dichloride, chloroform, carbon tetrachloride, and dichloroethylene; aliphatic hydrocarbons exemplified by hexane, heptane, and cyclohexane; petroleum solvents such as mineral spirits, gasoline, kerosene and naphtha; turpentine; and the like.

The propellants having utility in forming the spray solutions or aerosols can be selected from various known agents including compressed gases such as carbon dioxide and propane, and halogenated hydrocarbons exemplified by the freons commonly designated, for example, as "Propellant 11" (trichloromonofluoromethane) and "Propellant 12" (dichlorodifluoromethane). Mixtures of the latter two are especially satisfactory.

The concentration of the insecticide used in formulating the spray solutions or aerosols of this invention is somewhat variable. Generally speaking, the insecticide should be used in an amount sufficient to provide a concentration of the insecticide of the order of from about 5% to about 50%, usually 10% to 25%, by weight, in the foam formed on a surface. Depending on the insecticide, or combination of insecticides, used, and the existing ambient conditions, the insecticidal compositions of this invention are capable of providing effective toxic action for periods of time ranging from one or three months, or more.

The following examples are illustrative of insecticidal compositions formulated in accordance with the teachings of the present invention. It will be understood that various changes may be made in the formulations with respect to ingredients and relative proportions thereof, without departing from the spirit of the present invention.

EXAMPLE 1

| Ingredient: | Weight percent |
|---|---|
| DDVP | 4 |
| Stearic acid | 20 |
| Methylene chloride | 36 |
| Propellant 11 | 16 |
| Propellant 12 | 24 |

EXAMPLE 2

| Ingredient: | Weight percent |
|---|---|
| DDVP | 3.2 |
| Peanut oil | 1 |
| Stearic acid | 30 |
| Methylene chloride | 25.8 |
| Propellant 11 | 16 |
| Propellant 12 | 24 |

EXAMPLE 3

| Ingredient: | Weight percent |
|---|---|
| DDVP | 3.2 |
| Diazinon (Geigy Chemical Co.) | 1 |
| Peanut oil | 1 |
| Stearic acid | 30 |
| Methylene chloride | 24.8 |
| Propellant 11 | 16 |
| Propellant 12 | 24 |

As can be seen from the foregoing examples, the compositions are essentially nonaqueous and the fatty acids are employed in unsaponified form.

What is claimed is:

1. An insecticidal composition in an aerosol spray container containing a propellant and an organic solvent, said solvent being selected from the group consisting of methylene chloride, ethylene dichloride, chloroform, carbon tetrachloride, dichloroethylene, hexane, heptane, cyclohexane, and mineral spirits, comprising a pressurized, substantially nonaqueous, intimate mixture of a toxic concentration of a vaporizable insecticide which is volatile at ambient temperatures, and an unsaponified $C_{18}$–$C_{22}$ fatty acid, said fatty acid being characterized in that, upon spraying of the pressurized mixture from an aerosol container onto a surface, it forms a stable, substantially form-sustaining foam which maintains the insecticide carried thereby on the surface and retards the volatilization of the insecticide whereby the insecticide is released at a controlled rate from said foam in toxic concentrations over a prolonged period of time at ambient temperatures, said insecticide being present in said fatty acid in its applied form in a concentration of from about 5% to about 50%, by weight.

2. A composition in accordance with claim 1 wherein the fatty acid is one which is normally solid at room temperatures.

3. A composition in accordance with claim 1 wherein the vaporizable insecticide is a volatle dialkyl substituted vinyl phosphate.

4. A composition in accordance with claim 1 wherein a mixture of vaporizable insecticides is used.

5. A composition in accordance with claim 1 wherein the fatty acid is selected from the group consisting of myristic acid, palmitic acid, stearic acid, arachidic acid, and melissic acid.

6. A composition in accordance with claim 3 wherein the insecticide is a 2,2-dichlorovinyldimethyl phosphate.

7. A composition in accordance with claim 1 wherein the fatty acid is a triple pressed stearic acid.

8. A composition in accordance with claim 1 wherein the vaporizable insecticide is a volatile organophosphorus insecticide.

9. A composition in accordance with claim 8 wherein the phosphate is present in an amount sufficient to provide a concentration thereof in the foam of from about 10% to about 25%, by weight.

10. An insecticidal composition in an aerosol spray container comprising, basic weight, a pressurized, substantially non-aqueous mixture of about 4%, 2,2-dichlorovinyldimethyl phosphate, about 20% stearic acid, about 36% methylene chloride, and about 40% of a propellant, said composition when sprayed onto a surface forming a stable, substantially form-sustaining foam which releases the said phosphate at a controlled rate in toxic concentrtaions over a prolonged period at ambient temperatures.

11. An insecticidal composition in an aerosol spray container comprising, basis weight, about 4% 2,2-dichlorovinyldimethyl phosphate, about 1% peanut oil, about 30 %stearic acid, about 25% methylene chloride, and about 40% of a propellant, said composition when sprayed on a surface forming a stable, substantially form-sustaining baited foam which is attractive to insects and which releases the said phosphate at a controlled rate in toxic concentrations over a prolonged period at ambient temperatures.

12. A method of maintaining a long-lasting toxic concentration of a volatile insecticide in a room, comprising incorporating an intimate mixture of a toxic concentration of a vaporizable insecticide which is volatile at ambient temperatures and an unsaponified $C_{18}$–$C_{22}$ fatty acid into an aerosol spray container containing a propellant and an organic solvent, said solvent being selected from the group consisting of methylene chloride, ethylene dichloride, chloroform, carbon tetrachloride, dichloroethylene, hexane, heptane, cyclohexane, and mineral spirits, said fatty acid being characterized in that, upon application of the insecticidal composition to a surface, it is formed into a stable, substantially form-sustaining foam which maintains the insecticide at a preselected site in a room and retards the volatilization of the insecticide whereby the insecticide is released at a controlled rate from said foam in toxic concentrations over a prolonged period at ambient temperatures, and spraying the composition on a preselected surface in a room to form said insecticide containing foam.

No references cited.

ALBERT T. MEYERS, Primary Examiner

S. J. FRIEDMAN, Assistant Examiner